March 11, 1952     R. DUSEK ET AL     2,588,349
INTERNAL-COMBUSTION HEATING APPARATUS
Filed Sept. 7, 1946     6 Sheets-Sheet 1

Inventors
Robert Dusek
Stanley J. Budlane
By Mueller and Mason
Attys.

March 11, 1952 R. DUSEK ET AL 2,588,349
INTERNAL-COMBUSTION HEATING APPARATUS
Filed Sept. 7, 1946 6 Sheets-Sheet 3

Fig. 4.

Inventors
Robert Dusek
Stanley J. Budlane
By Mueller and Mason
Attys.

March 11, 1952 R. DUSEK ET AL 2,588,349
INTERNAL-COMBUSTION HEATING APPARATUS
Filed Sept. 7, 1946 6 Sheets-Sheet 4

Fig. 5.

Inventors.
Robert Dusek
Stanley J. Budlane
By Mueller and Mason
Attys.

March 11, 1952 R. DUSEK ET AL 2,588,349
INTERNAL-COMBUSTION HEATING APPARATUS
Filed Sept. 7, 1946

Inventors:
Robert Dusek
Stanley J. Budlane
By Mueller and Mason
Attys.

Patented Mar. 11, 1952

2,588,349

UNITED STATES PATENT OFFICE 2,588,349

INTERNAL-COMBUSTION HEATING APPARATUS

Robert Dusek, Berwyn, and Stanley J. Budlane, Chicago, Ill., assignors to Motorola, Inc., a corporation of Illinois Application September 7, 1946, Serial No. 695,478

4 Claims. (Cl. 126—110)

This invention relates generally to heating apparatus and in particular to an internal combustion heater particularly adaptable for installation in automobiles and other vehicles and for general portable use.

In the prior art various attempts have been made to provide portable internal combustion heaters which are of small, compact and rugged construction so that they will be suitable for installation in automobiles or other vehicles and for general portable use. In these heaters difficulty has been experienced in producing a unit which will operate efficiently over a wide range of heat outputs as is required to heat the passenger compartment of a vehicle, for example, to the desired temperature in various weather conditions. In general, a heater which is capable of producing the amount of heat required under the very coldest conditions would produce too much heat and/or would operate inefficiently in relatively mild weather.

Further difficulties have been encountered in providing a heater which is of very small size so that it may be easily installed or carried and which is of sufficiently rugged and fool-proof construction that dependable operation will be provided. For safe operation, it is necessary that the heater structure be so arranged that the combustion air is isolated from the air to be heated so that the poisonous exhaust gases are carried away from the space being heated.

A still further problem involved is to provide a heater which will produce a large heat output without requiring a large amount of power for operating the same. In vehicle installations the heater must be operated by power obtained from the vehicle battery, and as the available power in the vehicle battery is almost entirely utilized by other accessories, the power available for operation of the heater is very limited. Also for portable use, it is desirable that a small amount of external power be required for operation of the heater as in many cases a portable battery will be the only source of electrical power available. Accordingly, an arrangement is necessary whereby the fuel is conditioned for burning, the products of combustion are exhausted, and air to be heated is circulated through the heater by the use of a minimum amount of power.

It is an object, therefore, of the present invention to provide an improved internal combustion heater which is compact and rugged as required for installation in vehicles and for general portable use.

It is another object of this invention to provide an internal combustion heater in which stable and efficient operation is had at widely varying heat outputs.

A further object of this invention is to provide an internal combustion heater which is arranged for easy installation in various applications.

A feature of this invention is the provision of a compact and rugged heater unit having a base member on which all of the components of the heater are mounted and to which all external connections of the heater are made.

Another feature of this invention is the provision of an internal combustion automobile heater which is adapted to be mounted either on the cowl or under the seat of an automobile.

An additional feature of this invention is the provision of a portable internal combustion heater in which a single motor drives air circulating means for providing air for combustion and for circulating air to be heated through the heater and in which the components of the heater are so arranged that a large amount of air is circulated by the use of a small amount of power.

Still another feature of this invention is the provision of a burner structure and means for providing preheated air and fuel therefor so that the combustion of the fuel in the burner structure is steady.

Further objects, features and advantages will be apparent from a consideration of the following description taken in connection with the accompanying drawings in which.

In practicing our invention we provide a self-contained internal combustion heater including an annular base member on which all components of the heater are mounted. A motor is positioned off-center of the base member and a C-shaped combustion chamber is positioned about the motor. The combustion chamber has an opening at one end in which a burner unit including a pilot burner and a plurality of additional burning passages are positioned. The base member has a chamber therein in which combustion air is preheated prior to entry into the burner and an exhaust chamber having a fan therein for causing circulation of air through the combustion chamber. A housing is positioned on the base member and forms a passage about the combustion chamber for air to be heated. A fan is positioned in the housing at the end remote from the base for circulating air through this passage. Fuel feeding means are positioned within the housing between the ends of the combustion chamber for selectably feeding fuel to the burning passages depending upon the heat output required, and a control circuit is provided for automatically controlling the fuel feeding means and for controlling the operation of the heater in general. The heater is suitable for mounting on the cowl or under the seat in an automobile, the only parts differing for the two installations are the mounting means and the vent means for directing the heated air.

Figure 1:
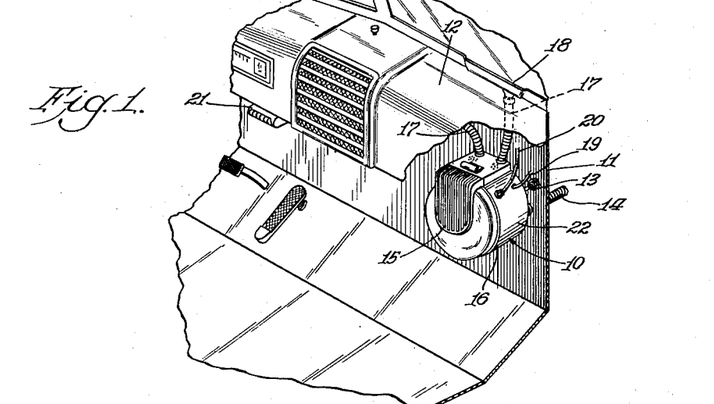
Fig. 1 is a perspective view of the heater in accordance with the invention shown installed on the cowl of an automobile.

Referring now to the drawing, in Fig. 1 the heater 10 in accordance with the invention is shown mounted on the cowl 11 of an automobile under the dash 12. The heater is mounted by a plurality of bolts 13 and includes conduits 14 extending through the fire wall for providing intake and exhaust of combustion air. The heater includes a grille 15 through which air from the passenger compartment of the automobile enters the heater. An annular opening 16 is provided through which the heated air is forced into the passenger compartment. Conduits 17 are provided for admitting heated air to the defroster slots 18 normally provided in the dash adjacent the windshield. For the purpose of providing fuel for the heater from the vehicle fuel system, a fuel feed line 19 is provided. A cable 20 makes electrical connections to the heater from the push button control head 21 as will be hereinafter explained. The fuel feed line and cable enter the housing through suitable connectors in a removable portion 22 of the housing which is provided to furnish access to the operating components of the heater as will be presently explained.

For a description of the detailed structure of the heater, reference is made to the Figs. 2, 3, 4 and 5 in which the heater is shown having a base member 23 on which a motor 24 is mounted as by brackets 25. A C-shaped combustion chamber 26 is positioned about the motor as is clearly shown in Figs. 2 and 5. The base member 23 together with the bottom plate 27 secured thereto define a plurality of chambers. An intake air chamber 28 is provided therein into which air enters through opening 29 in the base plate 27. After the air is preheated in the chamber 28 in the base member, it passes through opening 30 therein to the burner housing 31 which is secured to the combustion chamber 26. The base member also has an exhaust chamber 32 therein connected through opening 33 to the exhaust end 34 of the combustion chamber. The combustion chamber 26 is secured to the base member 23 adjacent the openings 30 and 33 therein. Therefore the base member 23 is in heat conducting relationship with the combustion chamber and is heated thereby. The exhaust gases passing through the exhaust chamber 32 also serve to heat the base member. Therefore the base member is held at a relatively high temperature so that the air passing through the intake air chamber 28 therein is substantially preheated. A fan 35 driven by motor 24 is positioned in the chamber 32 to cause a suction therein for exhausting the combustion air through opening 36 in the base plate. It is, therefore, seen that a complete passage for combustion air is provided through the intake chamber in the base plate into the burner housing then through the combustion chamber to the exhaust end thereof and into the exhaust chamber in the base plate where the suction fan causes the air to be exhausted from the heater. This passage is shown by the arrows in Fig. 5.

Figure 2:
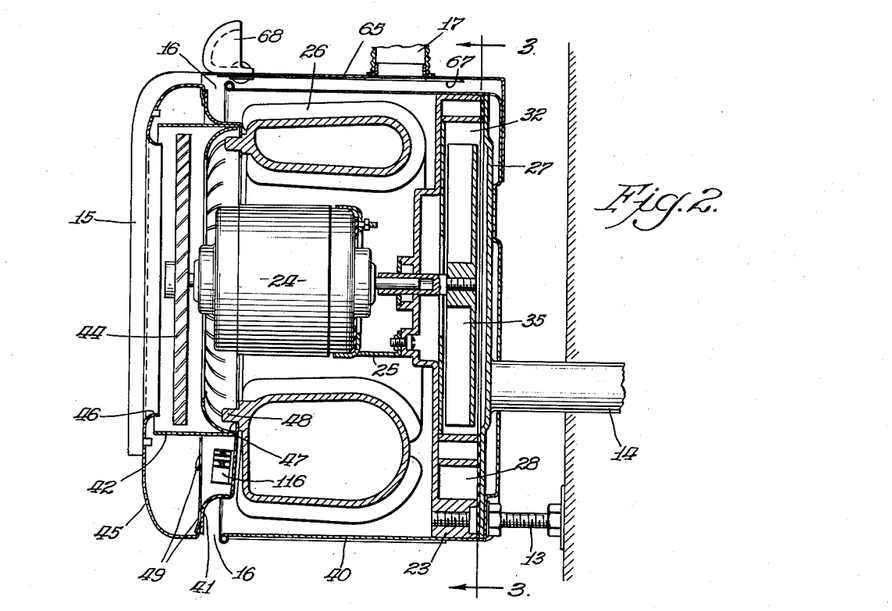
Fig. 2 is a cross-sectional view of the heater of Fig. 1.
Figure 3:
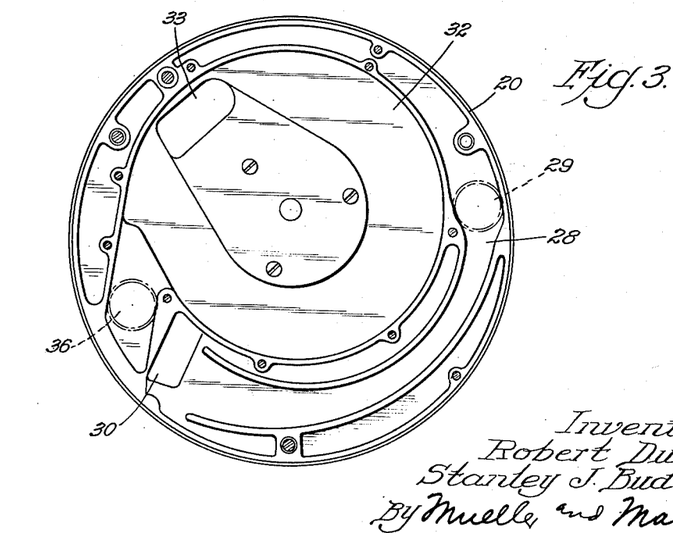
Fig. 3 is a detailed view of the base plate of the heater.

The housing 40 inclosing the heater structure is also secured to the base member 23 and cooperates with the motor 24 and combustion chamber 26 to form a passage for air to be heated between the motor and combustion chamber to the base member and thence between the combustion chamber and the housing to the open end of the housing. Secured to the top of the combustion chamber is a plate 41 on which is supported a cylindrical member 42 and a stationary fan or air guide 43 for directing the air entering the heater. Above the stationary fan 43 is an axial fan 44, also driven by motor 24, for the purpose of drawing air into the heater. The air guide 43 functions to straighten the flow of air entering the heater and reduces the turbulence thereof. A cover member 45 is provided across the open end of the housing having an opening 46 therein over which grille 15 is placed. The plate 41, cylindrical member 42 and air guide 43 form an assembly which is supported on casting 26. Openings 47 are provided in plate 41 which register with projections 48 on casting 26 to secure the assembly to the casting (Fig. 2). The cover member may be secured to the plate 41 by any suitable means such as by clips 49 secured to the plate 41. The air, after passing about the combustion chamber and being heated, leaves the housing through annular opening 16 between the plate 41 and the housing 40.

Figure 4:
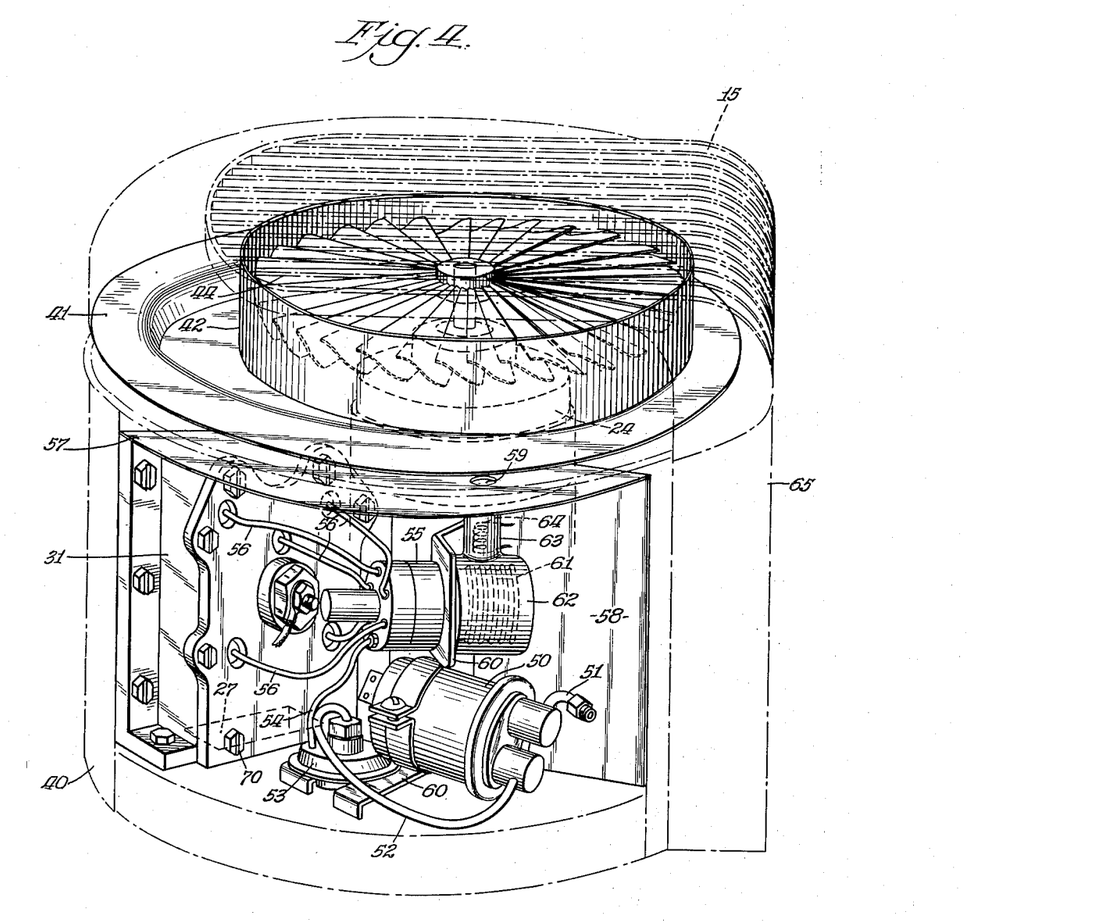
Fig. 4 is a perspective view illustrating the operating components of the heater.
Figure 5:
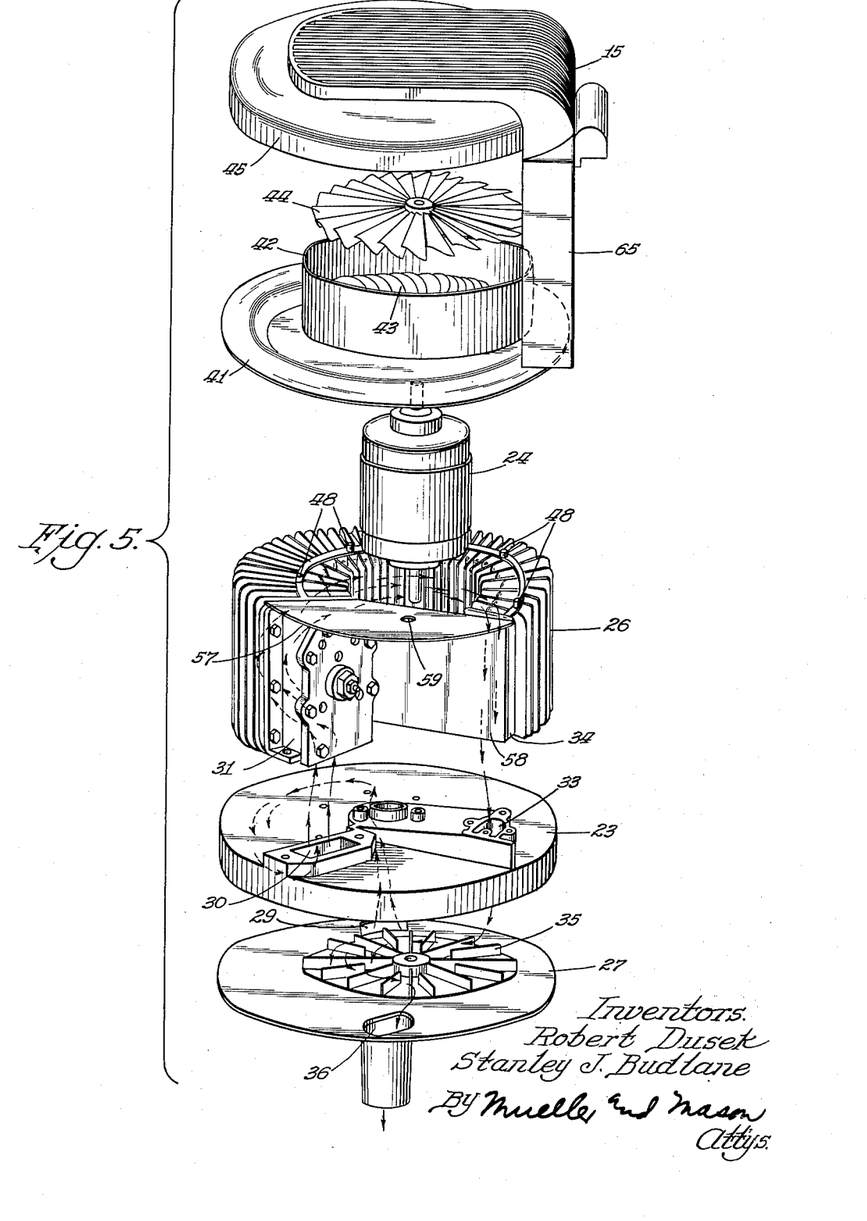
Fig. 5 is an exploded view showing the manner in which the major components of the heater are inter-positioned.

As is apparent from Figs. 4 and 5, the burner and fuel feeding means are positioned in an arcuate portion between the ends of the combustion chamber 26. Fuel is drawn into the heater by the fuel pump 50 through fuel line 51 and is then supplied through fuel line 52 to pressure regulator 53 and through fuel line 54 to selector 55. The fuel pump and pressure regulator may be of any standard construction, the selector preferably being of the construction disclosed in application Serial No. 644,693 filed February 1, 1946, by Stanley J. Budlane and assigned to the present assignee. The selector provides fuel through fuel lines 56 to a pilot burner and a plurality of additional burning passages as will be later described. The arcuate portion is divided off by the burner housing 31 and by insulating members 57 and 58 as shown in Fig. 5. The insulating member 57 has an opening 59 therein permitting a limited amount of air drawn in by the fan 44 to enter the arcuate portion. The fuel pump, pressure regulator and selector are supported on a bracket 60 which is mounted on the insulating member 58. As described in the above mentioned application, the selector includes a temperature responsive element 61 which controls the supply of fuel to the fuel lines 56. A housing 62 is provided for the temperature responsive element having a neck portion 63 which forms a conduit for directing a portion of the air entering the arcuate portion through opening 59 into the housing so that it comes in contact with the temperature responsive element. A heating coil 64 is provided in the neck portion 63 to selectively heat the air before contacting the temperature responsive element in a manner to be described. As is apparent from Figs. 1, 2, 4 and 5, the grille 15 extends back to a defroster housing 65 to which heated air is admitted through the opening 16 at the top of the housing. The housing 65 has opening 66 therein to which the defroster conduits 17 are attached. A slide 67 having an actuating lip 68 is provided for selectively furnishing heated air to the conduits.

Reference is now made to Figs. 6, 7, 8 and 9 in which the details of the burner structure are shown. The burner is provided with a housing 31 having a plurality of openings therein utilized as burning passages, with a cover plate 70 secured thereto to provide a passage 71 which is adapted to receive combustion air from the base member 23 through the opening 30 therein. The cover plate 70 has an opening therein in which igniter 72 is mounted and a plurality of additional openings to receive the fuel feeding lines 56. The igniter includes an electrical heating coil 73 having a portion supported by a ceramic cylindrical member 74 and an exposed portion 75. The igniter is arranged to be connected to a source of electrical power through terminal 76, the other end being grounded through the heater housing. The ceramic member 74 of the igniter is surrounded by a pair of spaced cylindrical members 77 and 78, the member 78 having an opening 79 therein through which air and fuel are admitted to the annular passage between the members. A cup-shaped portion 80 is provided on the cover plate 70 into which fuel is admitted through one of the fuel lines 56 and through which air is admitted from passage 71. Fuel and air are mixed in the portion 80 and fed to the annular passage in the igniter. This mixture is heated as it traverses the passage causing the fuel to be vaporized and when the mixture reaches the end of the cylindrical member 77 it is ignited by the exposed portion 75 thereof. Due to the current of air through the burner, caused by the suction of fan 35, the flame will move to the ports 81 in the front plate 82 of the burner after combustion has started. The igniter will be de-energized when combustion is started and as the burning does not take place directly at the coil, the coil will not be in danger of becoming burned out because of the high temperatures.

Figures 6, 7, 8, 9:
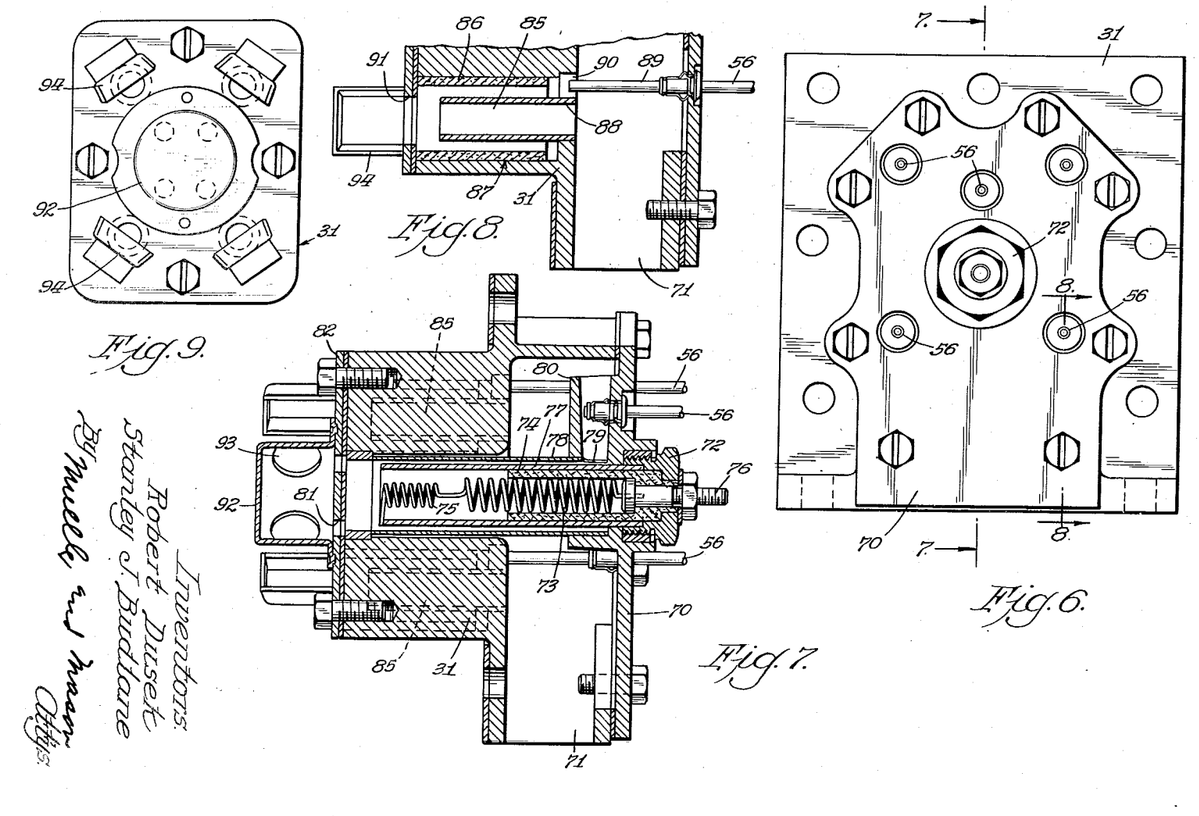
Figs. 6 to 9 show details of the burner construction.

As shown by the dotted lines in Figs. 7 and 9, additional burners 85 are provided about the pilot burner 72. These additional burners are shown in detail in Fig. 8. The burners 85 include cylindrical ceramic liners 86 positioned in openings 87 in the housing 31 and small tubular members 88 secured to the housing and extending within the ceramic liners. Conduit members 89 connected to the fuel feeding lines 56 provide for the entry of fuel between the tubular members 86 and 88 and air entering through passage 71 enters through tubular member 88 and also through the opening 90 about conduit 89 into the passage between the tubular members 86 and 88. The heat from the pilot burner heats the entire burner housing 31 and, therefore, the air and fuel mixture traversing the burner passages becomes heated. Contact of the fuel with the hot ceramic liners causes vaporization thereof so that a combustible mixture is provided which passes through the ports 91 in the front plate 82. As clearly shown in Figs. 7 and 9, a deflector 92 is provided over the ports 81 for the pilot burner. This deflector causes the flame from the pilot burner to circulate to provide efficient burning and has openings 93 therein through which a portion of the flame from the pilot burner may escape. The openings 93 are directed toward the ports 91 for the additional burners so that the flame from the pilot burner ignites the mixture from these burners. Deflector members 94 are provided over the ports 91 so that the flame from the burning passages tends to circulate causing all the mixture to become ignited to thereby provide efficient combustion.

Figure 10:
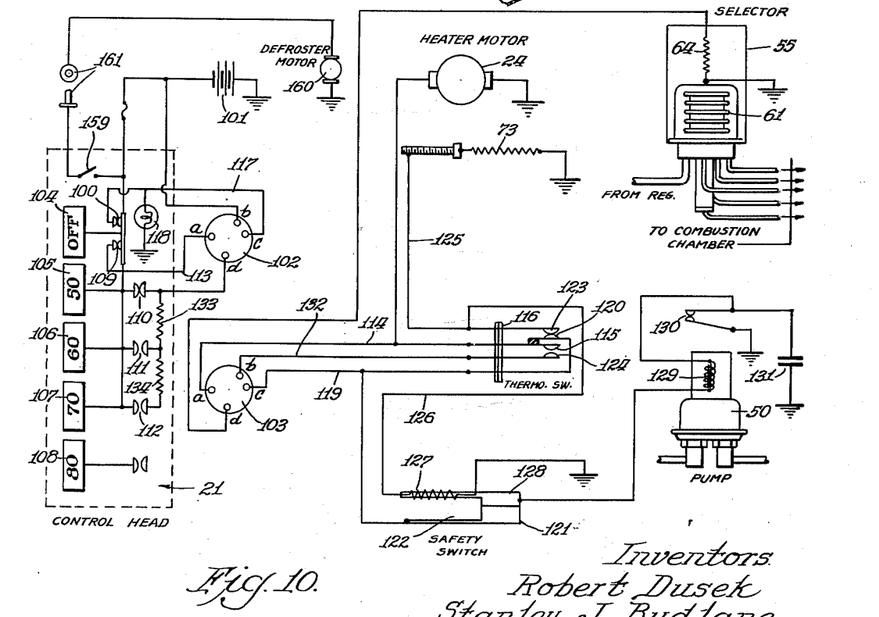
Fig. 10 illustrates the control circuit for the heater.

The control circuit for the heater is illustrated in Fig. 10. The push button control head 21 is connected to a source of potential 101 such as the storage battery of an automobile and is connected to the operating components of the heater through plug 102 and receptacle 103. The control head 21 includes five push buttons 104, 105, 106, 107 and 108 which are mechanically interlocked so that when any button is depressed the other push buttons are automatically released. It is noted that the two sets of contacts 100 and 109 associated with push button 104 are adapted to be opened when the push button is depressed and the contacts 110, 111 and 112 associated with push buttons 105, 106 and 107, respectively, are arranged to be closed when the push buttons are depressed. Although contacts are shown associated with push button 108, these contacts are not used, the only function of push button 108 being to release each of the other push buttons. It is apparent that any standard push button switch assembly may be used in the control panel, the only requirements being that the contacts are sufficiently heavy to carry the currents involved and that one push button opens two sets of contacts and the other push buttons each close the associated contacts. For this reason the mechanical details of the push button switch will not be described.

When operation of the heater is not desired, the push button 104 indicated on the drawing as "off" will be depressed and contacts 100 and 109 will be opened. When operation of the heater is desired, any one of the push buttons 105, 106, 107 or 108 will be depressed and the switch contacts associated therewith will be closed as well as the switch contacts 100 and 109 as the switch button 104 will return to its normal position because of the mechanical interlock. This will apply the potential from the battery 101 through contacts 109 to the conductor 113 which is connected to the terminal marked a of plug 102. When the plug and receptacle are engaged this will energize terminal a of receptacle 103, and make a connection through conductor 114 to motor 24 and contact 115 of thermostatic switch 116. The closing of contacts 100 will connect conductor 117 which energizes a pilot light 118 and terminal c of plug 102. Connection is made through terminal c of receptacle 103 to conductor 119 which energizes contact 120 of thermostatic switch and contact 121 of safety switch 122. The thermostatic switch 116 may be of any standard construction and in addition to the movable contacts 115 and 120 includes stationary contacts 123 and 124. The movable contacts are moved by a suitable temperature responsive element from the position shown, when the element is cold to a position in which the contacts 120 and 123 are broken and the contacts 115 and 124 are engaged when the element is hot. The movable contacts 115 and 120 are insulated from each other. The thermostatic switch is mounted on the combustion chamber as shown in Fig. 2 adjacent to the burner to be controlled by the temperature thereof.

When the combustion chamber is cold the contacts 120 and 123 will be closed to thereby apply potential to the conductor 125 which energizes igniter 73 and to the conductor 126 which energizes the heating coil 127 of the safety switch 122. The safety switch 122 is arranged so that the contacts 121 and 128 thereof will normally be closed providing a circuit to the pump 50. Although the pump 50 may be of any standard construction, a solenoid operated pump is illustrated having a coil 129 for driving the same and a pair of contacts 130 for interrupting the circuit through the solenoid in a well known manner. A condenser 131 is bridged across the contacts 130 to eliminate sparking thereof. After the heater has been started and the combustion chamber becomes hot, the thermostatic switch 116 will move to the lower position with the contacts 120 and 123 opening to de-energize the igniter 73 and the heating coil 127 of the safety switch.

The safety switch 122 is a slow acting bi-metal switch which requires that the heating coil 127 be energized for a relatively long time before the switch contacts 121 and 128 will open. The purpose of this switch is to stop the pump and thereby stop the flow of fuel to the combustion chamber in the event that ignition of the fuel does not take place. For this reason, the switch must allow sufficient time for combustion to start before opening the contacts 121 and 128.

The contacts 115 and 124 of the thermostatic switch are closed when the combustion chamber is hot providing a parallel circuit for the motor through conductor 132. This conductor is connected through terminal b of receptacle 103 and terminal b of the plug 102 directly to the battery 101 and is always energized. This parallel circuit will remain closed after the main switch contacts 109 are opened until the combustion chamber cools off and the thermostatic switch moves to the upper position breaking the contacts 115 and 124. This arrangement permits the fan 35 to clean out the combustion chamber after combustion ceases to condition the heater for the next use.

In addition to the main operating circuit as above described, an auxiliary circuit is provided through the push button switches 105, 106, 107 and 108 for control of the heating coil 64 associated with selector 55. As previously stated the selector 55 includes a temperature responsive element 61 over which air entering the heater is passed to control the supply of fuel to the heater in accordance with the temperature of the incoming air. In order to provide a system whereby the air in the space to be heated is heated to any temperature desired, the heating coil 64 is provided to heat the air in predetermined amounts before it comes in contact with the temperature responsive element to thereby change the temperature range to which the element is responsive. In a specific application the temperature responsive element 61 is arranged to control the flow of fuel to the heater so that the temperature of the air in the space to be heated (the temperature of the air entering the heater) is 80° F. If it is desired that the temperature in the space to be heated be only 70° F., the heating coil 64 can be energized to increase the temperature of the air entering the selector so that the temperature of the air contacting the temperature responsive element is actually 80° F. This operation is described in detail in application Serial No. 644,693 referred to above. To provide selective heating by the heating coil 64, contacts 110, 111 and 112 and resistors 133 and 134 are provided. It is apparent that when push button 105 is depressed, the coil 64 will be connected through contact 110 directly to the voltage of the battery 101 causing the coil 64 to produce the maximum amount of heat. This will, of course, cause the air contacting the temperature responsive elements of the selector to be heated a great amount and the selector to therefore feed a small amount of fuel with the result that the space to be heated will be held at relatively low temperature. Operation of push button 106 will cause the heating coil 64 to be connected to the battery 101 through contacts 111 and resistor 133 causing the current through coil 64 to be less and the heating of the air by the coil to be correspondingly less. This will cause the selector to feed more fuel to provide a higher temperature in the space to be heated. Operation of push button 107 will cause the heating coil 64 to be connected to the battery through contacts 112 in series with resistors 133 and 134 causing a still smaller current through the coil 64 and a correspondingly higher temperature in the space to be heated. When the push button 108 is operated the heating coil 64 is completely de-energized and the temperature responsive element 61 is responsive to the temperature for which it is naturally designed. This will provide a higher temperature in the space to be heated than when heating coil 64 is energized. It is apparent that by proper design of a temperature responsive element and by proper selection of the coil 64 and resistors 133 and 134, the push buttons 105, 106, 107 and 108 can be made to provide any four temperatures desired. These buttons may be marked 50, 60, 70 and 80 indicating that in a particular application the components are designed to provide temperatures of 50, 60, 70 and 80 degrees Fahrenheit. If finer adjustments of temperature are desired, more push buttons and more resistance elements can, of course, be provided.

The operation of the heater as described above will now be set forth. The temperature to which the automobile is to be heated will be chosen in accordance with the desires of the persons in the automobile, the outside temperature generally being an important consideration. Let us assume that a temperature of 70° F. is desired and the push button marked 70 is actuated. This will cause the motor to operate to circulate air through the combustion chamber as well as circulate air from the automobile through the heater. The pump will deliver fuel to the selector through the pressure regulator and the igniter and heating coil of the safety switch will be energized. The selector will deliver fuel to the pilot burners and may also deliver fuel to the additional burners depending on the temperature of the air entering the heater. The fuel entering the pilot burner is heated by the igniter, mixed with air, and then ignited by the exposed end of the igniter coil. This causes the combustion chamber to become hot and the air being circulated through the heater to be heated. The combustion chamber will soon reach a sufficiently high temperature to cause the thermostatic switch to operate to cut off the igniter and the heating coil of the safety switch. It is to be noted that if combustion did not take place, the safety switch would, after a predetermined time, cut off the fuel pump so that a large amount of fuel would not accumulate in the burner which might cause an explosion on subsequent ignition.

As the air in the automobile is heated, the temperature of the air entering the heater from the automobile will be raised so that the selector will deliver less fuel to the burners. Accordingly, if the automobile was very cold when the heater was started, all the burners would be supplied with fuel immediately and a very large amount of heat would be provided. If the outside temperature is very low, it may be necessary for all the burners to continue operation to heat the automobile to the desired temperature. However, the heat output of the heater is so great that the automobile will usually heat up so that fuel will be supplied to only a part of the burners and perhaps only to the pilot burner. It is pointed out here that fuel is fed to the pilot burner at a fixed rate all the time that the heater is operating but fuel is fed to the additional burners in accordance with the heat output required and varying amounts may be fed to each burner. This is fully explained in application Serial No. 644,693, referred to above. Therefore, the pilot burner always operates while the heater is operating and supplies a small amount of heat for heating the automobile as well as serving to condition and ignite fuel which may be supplied to the other burners. This permits the heat output of the heater to be changed very rapidly and to vary through a wide range.

When the heater is turned off by the push button switch the fuel pump will be de-energized causing combustion to stop but the motor will remain energized through the thermostatic switch as long as the combustion chamber is of such temperature as to hold the switch in the hot position. This causes the circulation of air to continue through the combustion chamber to clean out any residue of fuel or exhaust gases therein so that the burner will be in proper condition for a subsequent operation. The heater cannot be started until the combustion chamber is cooled off as the igniter will not be energized until the thermostatic switch is in the cold position. The continued operation of the pump also circulates air through the heater to thereby lower the temperature of the combustion chamber very rapidly. When the combustion chamber has cooled down to a predetermined temperature, the thermostatic switch will operate to disconnect the motor and the heater is completely de-energized.

Figure 11:
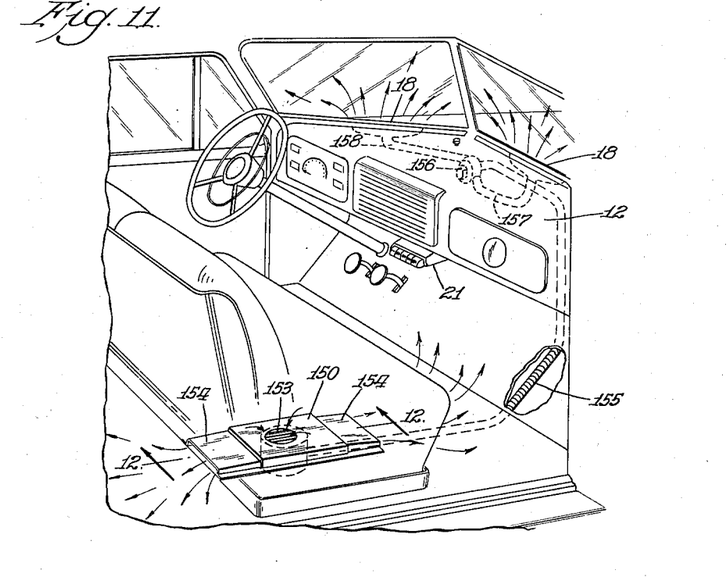
Fig. 11 illustrates the mounting of the heater in accordance with the invention under the seat of an automobile; and, Fig. 12 is a cross-sectional view of the heater and installation of Fig. 11.
Figure 12:
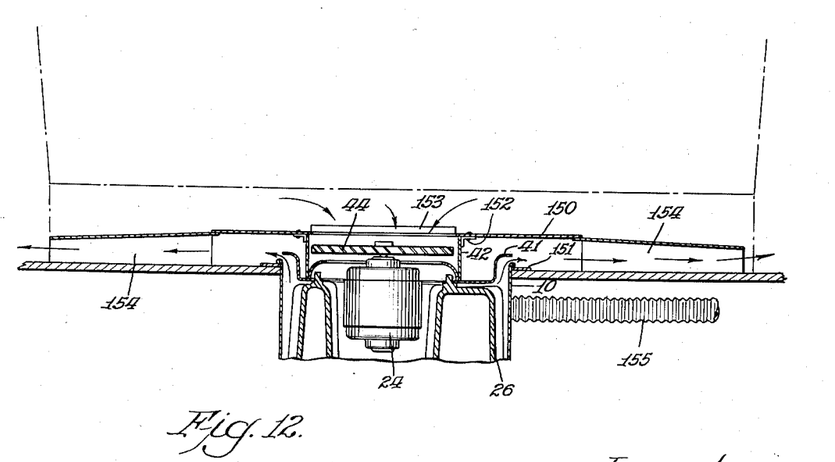

In the foregoing a heater adapted for mounting on the cowl of an automobile has been described. Referring now to Figs. 11 and 12, it is apparent that the heater is also adaptable for mounting under the seat of an automobile. It is obvious from a comparison of Figs. 2 and 12 that identical structure is used regardless of the position in which the heater is mounted except that the cover member 45 of Fig. 2 is replaced by cover member 150 of Fig. 12. The heater is mounted by securing a mounting plate 151 to the housing 10, the mounting plate being secured to the floor boards of the automobile to suspend the heater therefrom. The cover member 150 is secured to the cylindrical member 42 of the heater by clips as indicated at 152. Openings 153 are provided in the cover member 150 opposite the fan 44 to permit air to be drawn into the heater by the fan. As indicated in Fig. 11, the cover member 150 is of generally rectangular shape having open ends adjacent which ducts 154 are positioned to cause the heated air passing between the housing 10 and the plate member 41 of the heater to be conducted both to the front and the rear of the seat of the automobile.

The defroster housing as provided for the cowl mounted heater is eliminated in the under-seat mounting and connection is made to the defroster slots 18 through a flexible conduit 155. An opening is provided in the housing 10 and the flexible conduit 155 is secured thereto so that heated air may enter the conduit. As a relatively long conduit is required, a blower 156 is provided which is installed under the dash 12 of the automobile and has outlets connected to conduits 157 and 158 which are connected to the two defroster slots in the dash. It is not necessary to close the opening in the housing 10 when the defroster is not in use as the flexible cable is relatively long and very little heated air will pass therethrough when the blower 156 is not operating.

The control circuit for the heater of Figs. 11 and 12 may be identical to the circuit described with reference to the previous modification except that an additional switch 159 is provided on the control head. This switch may be of any type such as a simple toggle switch and connects the motor 160 of the defroster blower to the battery 101. A plug and socket connection 161 is provided so that the motor may be easily disconnected from the control head. The switch 159 thereby provides control of the defroster at such times as the heater is operating.

As is shown in Figs. 1 and 11, the control head 21 is mounted beneath the dash of an automobile to be in easy access to the operator of the automobile. In such an arrangement the receptacle 103 may be mounted directly on the heater housing and the plug 102 connected through a cable such as illustrated at 20 in Fig. 1 to the control head. This permits the control circuit to be easily disconnected to facilitate servicing of the heater. Such an arrangement is feasible for either type of mounting of the heater. It is obvious that the heater in accordance with the invention is also suitable for portable use in which case the heater unit as shown may be combined in a housing with a fuel tank and a battery, and the control head may be mounted directly on the housing.

From the foregoing description it is apparent that we have provided a heater which is of compact and rugged construction and in which the components are small and relatively simple. The burner and fuel feeding structure is such that steady efficient operation is provided through a wide range of heat outputs. The automatic control system is arranged so that by operating push buttons the space being heated will be automatically brought to the temperature desired regardless of the surrounding conditions.

While we have described what we consider to be the preferred embodiments of our invention, it is obvious that various changes and modifications can be made therein without departing from the intended scope of the invention as defined in the appended claims.

We claim:

1. Internal combustion heating apparatus comprising a base member for supporting the operating components of said apparatus and including intake and exhaust gas chambers therein, said base member being of relatively shallow configuration with said exhaust gas chamber being substantially centrally thereof and said intake chamber being elongated and extending about a portion of said exhaust chamber, said chambers having openings therein communicating with the atmosphere, a motor secured to said base member, a C-shaped member having a combustion chamber therein positioned about said motor and secured to said base member, said combustion chamber in heat transfer relation therewith having a combustion opening at one end of its arc and an exhaust opening at the other end of its arc, said exhaust opening being arranged to communicate with said exhaust gas chamber, an exhaust fan within said exhaust chamber driven by said motor for creating a suction at the exhaust opening of said combustion chamber and for exhausting gas from said exhaust chamber, whereby a circumferential flow is induced within said combustion chamber, means secured to said base member for providing a passage for air from said intake air chamber to said combustion chamber, a housing secured to said base member and surrounding the components of the heating apparatus to form a self-contained assembly, said housing forming a first passage for air about said combustion chamber, a cover for said housing having a central opening therein, said cover cooperating with said C-shaped member to form a second air passage about said combustion chamber, and a circulating fan disposed within said central opening and driven by said motor for circulating air to be heated.

2. An internal combustion heating apparatus including in combination, a relatively shallow base member on which the remaining parts of the heating apparatus are mounted, said base member having a cavity therein with dividing wall means in the cavity forming a substantially central exhaust chamber and an elongated intake chamber about at least a portion of said exhaust chamber and in heat transfer relation therewith, a motor mounted on said base member, a C-shaped, heat transfer member surrounding said motor and having a combustion chamber therein, said heat transfer member being supported on said base member in heat transfer relation therewith whereby the air in said intake chamber is heated by said heat transfer member, said combustion chamber and said base member being so constructed and arranged that a continuous passage is provided through said intake chamber said combustion chamber and said exhaust chamber, and a fan disposed in said base member and driven by said motor for causing a circumferential flow of combustion gases through said continuous passageway.

3. An internal combustion heating apparatus including in combination, a base member having both an elongated intake chamber and an exhaust chamber positioned substantially in the same plane therein, said exhaust chamber being positioned substantially centrally of said base member and said elongated intake chamber extending around at least a portion of said exhaust chamber, a motor mounted on said base member, a C-shaped, heat transfer member surrounding said motor and having a combustion chamber therein, said heat transfer member being supported on said base member in heat transfer relation therewith whereby the air in said intake chamber is heated by said heat transfer member, said combustion chamber and said base member being so constructed and arranged that a continuous passage is provided through said intake chamber said combustion chamber and said exhaust chamber, a fan disposed in said base member and driven by said motor for causing a circumferential flow of combustion gases through said continuous passageway, and means for supplying fuel to be burned to said combustion chamber, said last mentioned means being disposed in the open arcuate section defined by the ends of said C-shaped heat transfer member and operatively connected to said combustion chamber.

4. An internal combustion heating apparatus including in combination, a base member having both an elongated intake chamber and an exhaust chamber positioned substantially in the same plane therein, said exhaust chamber being of substantially cylindrical configuration with said elongated intake chamber extending about a portion of the circumference of said exhaust chamber, a motor mounted on said base member, a C-shaped heat transfer member having a combustion chamber therein, said heat transfer member being supported on said base member in heat transfer relation therewith whereby the air in said intake chamber is heated by said heat transfer member, said combustion chamber and said base member being so constructed and arranged that a continuous passage is provided through said intake chamber, said combustion chamber and said exhaust chamber, a fan disposed in said exhaust chamber and driven by said motor for causing a circumferential flow of combustion gases through said continuous passageway, burner means fixed to said C-shaped heat transfer member and disposed in the open arcuate section defined by the ends of said C-shaped member, said burner means being operatively connected to said combustion chamber, fuel supply means disposed in said open arcuate section and connected to said burner means, circulating air temperature control means disposed in said open arcuate section and operatively connected to said burner means, a housing secured to said base member and surrounding the components of the heating apparatus to form a self-contained assembly, said housing forming a first passage for air about said heat transfer member, a cover for said housing having a central opening therein, said cover cooperating with said C-shaped heat transfer member to form a second air passage about said heat transfer member, said first air passage and said second air passage being interconnected to form a continuous circulating air passageway about said heat transfer member, and a circulating fan disposed within said central opening and driven by said motor for circulating air to be heated.

ROBERT DUSEK.
STANLEY J. BUDLANE.

REFERENCES CITED

The following references are of record in the file of this patent:

UNITED STATES PATENTS

| Number | Name | Date |
|---|---|---|
| 1,633,066 | Breese | June 21, 1927 |
| 2,207,776 | Black | July 16, 1940 |
| 2,236,475 | Findley | Mar. 25, 1941 |
| 2,308,887 | McCollum | Jan. 19, 1943 |
| 2,314,089 | Hess et al. | Mar. 16, 1943 |
| 2,324,010 | Meyerhoefer et al. | July 13, 1943 |
| 2,332,969 | Higley | Oct. 26, 1943 |
| 2,388,970 | Hess et al. | Nov. 13, 1945 |
| 2,409,492 | Jones | Oct. 15, 1946 |
| 2,411,040 | Holthouse | Nov. 12, 1946 |
| 2,473,372 | Hess et al. | June 14, 1949 |
| 2,474,687 | Parrish | June 28, 1949 |
| 2,492,654 | Richards | Dec. 27, 1949 |